US008627849B2

(12) United States Patent
Hong

(10) Patent No.: US 8,627,849 B2
(45) Date of Patent: Jan. 14, 2014

(54) VALVE HAVING TWO OPPOSING SELF-SEALING POPPETS

(76) Inventor: Eng-Hao Hong, New Taipei (TW)

( * ) Notice: Subject to any disclaimer, the term of this patent is extended or adjusted under 35 U.S.C. 154(b) by 70 days.

(21) Appl. No.: 13/212,785

(22) Filed: Aug. 18, 2011

(65) Prior Publication Data

US 2013/0043421 A1    Feb. 21, 2013

(51) Int. Cl.
  F16K 43/00   (2006.01)
  F16K 31/06   (2006.01)
  F16K 1/16    (2006.01)
  F16K 31/00   (2006.01)

(52) U.S. Cl.
  USPC ............... 137/614.21; 137/614.19; 251/298; 251/335.2

(58) Field of Classification Search
  USPC ........... 137/614.21, 614.19, 614.11, 613, 137/315.37, 315.16, 637.3, 637.2, 637; 251/298, 299, 335.2, 142
  See application file for complete search history.

(56) References Cited

U.S. PATENT DOCUMENTS

| | | | | | |
|---|---|---|---|---|---|
| 2,200,416 | A | * | 5/1940 | Daniels | 137/614.11 |
| 3,587,601 | A | * | 6/1971 | Shippy | 137/67 |
| 4,285,497 | A | * | 8/1981 | Gottel | 251/129.2 |
| 5,913,505 | A | * | 6/1999 | Ouvrard et al. | 251/303 |
| 2006/0081296 | A1 | * | 4/2006 | Schwartz et al. | 137/614.11 |
| 2007/0044855 | A1 | * | 3/2007 | Hong | 137/614.21 |

* cited by examiner

*Primary Examiner* — Kevin Lee
*Assistant Examiner* — Michael R Reid
(74) *Attorney, Agent, or Firm* — Rabin & Berdo, P.C.

(57) ABSTRACT

A valve having two opposing self-sealing poppets includes a valve body, two poppets, a diaphragm and two levers. The valve body has two passages opposite to each other and two poppet seats disposed opposite to each other and corresponding to the passages. When the valve is in a closed state, both poppets are pressed against the poppet seats and the media is prevented from flowing in either direction. When the valve is in an open state, both poppets axially move away from the poppet seats and the media can flow in either direction.

8 Claims, 3 Drawing Sheets

VALVE HAVING TWO OPPOSING SELF-SEALING POPPETS

BACKGROUND OF THE INVENTION

1. Field of the Invention

The present invention relates to a fluid control device, and more particularly, to a valve for controlling the flow of either liquid or gaseous media.

2. The Prior Arts

Conventionally, a valve has a single poppet to control the flow of media, such as a liquid, gas, or other material, through a passage. To stop the media flow, the valve is provided with a spring, pneumatic pressure, electro-magnet, electro-mechanical device, mechanical screw or mechanical lever to force the poppet to seal the passage.

An external force is needed to seal the passage. Therefore, the inventor investigates a valve that utilizes the media pressure to stop the media flow and seal the passage. Because of utilizing the media pressure, the external force for sealing the passage is minimized. Thus, the media flow can be precisely controlled by the valve.

SUMMARY OF THE INVENTION

A primary objective of the present invention is to provide a valve in which minimum external force is needed to close a flow path.

In order to achieve the objective, a valve according to the present invention includes a valve body, a first poppet, a second poppet, a diaphragm, a first lever, a second lever and an actuator. The valve body includes a chamber disposed inside thereof, two passages disposed at opposite sides of the chamber and communicable with the chamber, and a first poppet seat and a second poppet seat respectively disposed around ends of the passages. The first poppet and a second poppet are disposed opposite to each other and respectively located corresponding to the first poppet seat and the second poppet seat. The diaphragm is disposed inside the valve body to define the chamber and keep the media sealed within the chamber. Each of the first lever and the second lever has one end disposed below the diaphragm and extended into the chamber to connect with the poppets and the other end disposed above the diaphragm and attached to the actuator. The actuator can be manually, pneumatically, mechanically or electrically powered.

One of characteristics of the present invention is that the media applied a pressure on rear surfaces of the poppets to press the poppets against the poppet seats, thereby producing the seal to the passage. By utilizing the media pressure, the only external force needed is for moving the poppet to come in contact with the poppet seat. When the total force exerted on the rear surface of the poppet by the media and the lever is greater than the force exerted by the media on the front surface of the poppet, media flow is stopped. When the valve is in a closed state to stop media flow in either direction, two poppet assemblies are positioned opposite to each other inside the valve body and along the media passage.

The present invention provides a valve that can be configured to be normally-closed or normally-open. The valve can be operated by various types of actuators, such as manual, pneumatic, mechanical or electrical means.

Preferably, the poppet is integrally formed. The valve body is also integrally formed. The diaphragm and the levers are also integrally formed. Preferably, the diaphragm and the levers are made of any suitable flexible polymer or elastomer material.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

Figure 1:
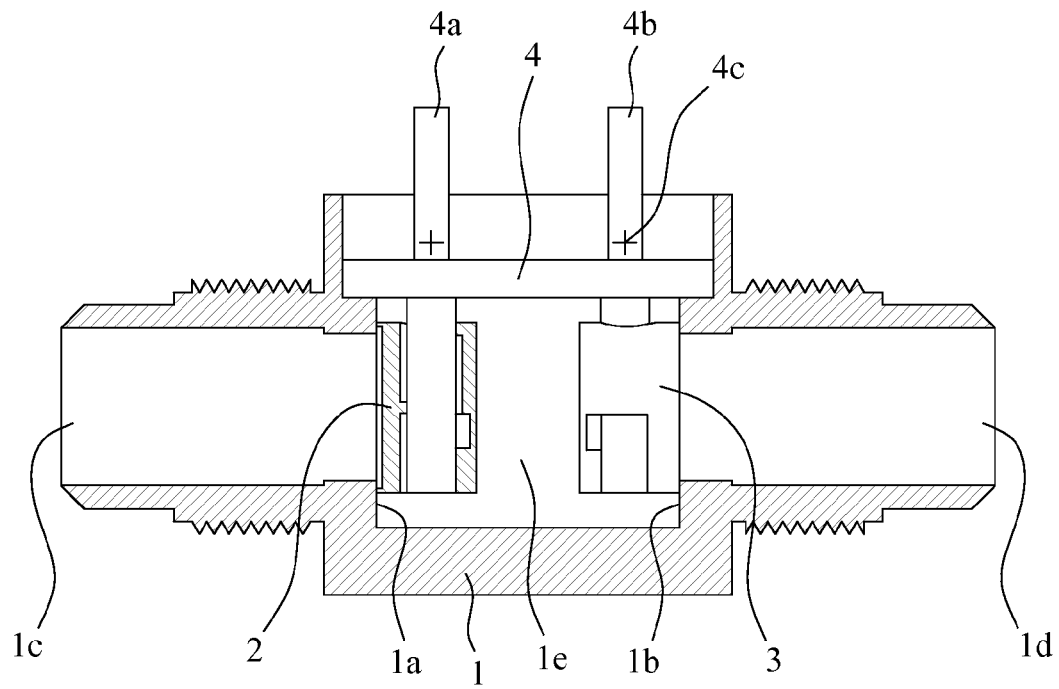
FIG. 1 is a cross-sectional view showing a valve having two opposing self-sealing poppets according to the present invention, with the poppets positioned in a closed state to stop media flow.
Figure 2:
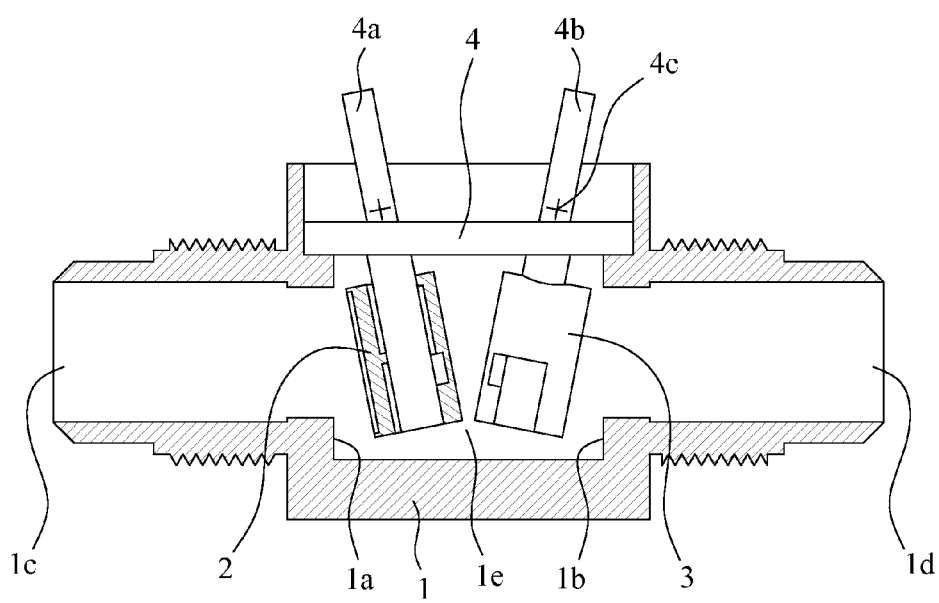
FIG. 2 is a cross-sectional view showing the valve having two opposing self-sealing poppets according to the present invention, with the poppets positioned in an open state to allow media flow.
Figure 3:
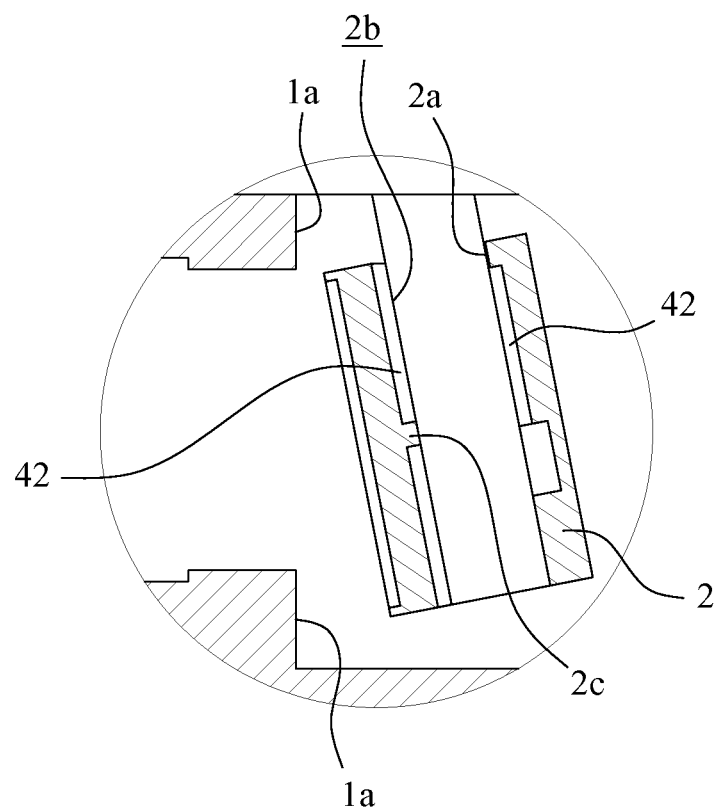
FIG. 3 is an enlarged cross-sectional view showing a poppet and a poppet seat of FIG. 2.

Referring to FIGS. 1 to 3, the valve having two opposing self-sealing poppets is used to open or close the flow path of media. The media refer to any kind of fluid, such as liquid, gas, liquid chemicals, gaseous chemicals, etc. FIG. 1 shows the valve in a closed state, which closes the flow path. FIGS. 2 and 3 show the valve in an open state, which opens the flow path. The valve according to a preferred embodiment of the present invention includes a valve body 1, a first poppet 2, a second poppet 3, a diaphragm 4, a first lever 4a, a second lever 4b and an actuator (not shown in drawings).

The valve body 1 includes a chamber 1e disposed inside thereof, an inlet passage 1c, an outlet passage 1d, a flat circular first poppet seat 1a and a flat circular second poppet seat 1b. The passages 1c, 1d are disposed at opposite sides of the chamber 1e and communicate with the chamber 1e. The first poppet seat 1a is disposed around an end of the inlet passage 1c adjacent to the chamber 1e, and the second poppet seat 1b is disposed around an end of the outlet passage 1d adjacent to the chamber 1e. When the valve is in the open state, the media flows from the inlet passage 1c into the chamber 1e and flows out of the chamber 1e into the outlet passage 1d. Preferably, the valve body 1 is integrally formed.

The diaphragm 4 is a round plate disposed inside the valve body 1 to define the chamber 1e and keep the media sealed within the chamber 1e. Each of the first and second levers 4a, 4b has a first end extending above the diaphragm 4 and a second end extending below the diaphragm. Each of the first and second levers 4a, 4b is pivoted at a pivot point 4c in order to allow the first and second levers 4a, 4b to pivot within a predetermined amount of angle. Preferably, the diaphragm 4, the first lever 4a and the second lever 4b are integrally formed and are a single piece. Each of the levers 4a, 4b may have an insert disposed inside thereof to improve the mechanical strength.

The cylindrical first and second poppets 2, 3 are disposed inside of the chamber 1e and opposite to each other. The first and second poppets 2, 3 are mounted at the second ends of the first and second levers 4a, 4b and located corresponding to the first and second poppet seat 1a, 1b, respectively. The first and second levers 4a, 4b are respectively pivoted to move the poppets 2, 3 towards or away from the poppet seats 1a, 1b. The first poppet 2 has a flat first side facing the inlet passage 1c and a second side facing the chamber 1e and the second poppet 3 has a flat first side facing the outlet passage 1d and a second side facing the chamber 1e. The first sides of the first and second poppets 2, 3 can seat flatly against the first and second poppet seats 1a, 1b to create a seal over the passages 1c, 1d, respectively. To stop or allow media flow, the poppets 2, 3 close or open the flow path by moving axially towards or away from the poppet seats 1a, 1b.

Referring to FIG. 3, each of the poppets 2, 3 has a bore 2b to receive the levers 4a, 4b. A first protrusion 2a is disposed at an upper circumference of the bore 2b of the poppet, and a second protrusion 2c is disposed at a middle circumference of the other side of the bore 2b. There is a gap 42 between the poppets and the levers, so the poppets are not rigidly fixed to the levers to allow lever action of the first protrusion 2a itself. When opening the media flow, the levers 4a, 4b pry the poppets 2, 3 away from the poppet seat 1a, 1b at the first protrusions 2a. Therefore, when the valve according to the present invention is transferred from the closed state to the open state, the amount of force needed to move the poppets 2, 3 away from the poppet seat 1a, 1b is reduced. Preferably, each of the first and second poppets 2, 3 is integrally formed.

The first ends of the levers 4a, 4b may connect with the actuator to open or close the flow path. The valve can be operated by various types of the actuators, such as manual, pneumatic, mechanical or electrical means.

When the total force exerted on the second side of the poppet 2, 3 by the media and the lever 4a, 4b is greater than the force exerted by the media on the first surface of the poppet 2, 3, media flow is stopped. When the total force exerted on the second side of the poppet 2, 3 by the media and the lever 4a, 4b is smaller than the force exerted by the media on the first surface of the poppet 2, 3, media flow is open. Because of utilizing the media pressure, minimum external force from the levers 4a, 4b is needed. Therefore, the valve according to the present invention can be precisely controlled.

What is claimed is:

1. A valve, comprising:
   a valve body having two poppet seats disposed opposite to each other;
   a first poppet and a second poppet respectively disposed corresponding to the poppet seats and used for closing or opening a flow path of media by moving axially towards or away from the poppet seats; and
   a first lever and a second lever respectively connected with the first poppet and the second poppet, each of the first lever and the second lever being pivoted at a pivot point to move the poppets axially toward or away from the poppet seats, the first lever and the second lever being capable of being actuated by manual, pneumatic, mechanical or electrical means; wherein
   each of the poppets further comprises a bore to receive the lever, a first protrusion being disposed within and at an upper circumference of one side of the bore, and a second protrusion being disposed within and at a circumference of the other side of the bore midway up a height of the bore, there is a gap between the poppets and the levers so the poppets are not rigidly fixed to the levers to allow lever action of the first protrusion itself.

2. The valve as claimed in claim 1, further comprising a diaphragm connected with the first and second levers.

3. The valve as claimed in claim 2, wherein the diaphragm, the first lever and the second lever are integrally formed.

4. The valve as claimed in claim 2, wherein the diaphragm, the first lever and the second lever are made of a polymer or an elastomer material.

5. The valve as claimed in claim 1, wherein the valve body is integrally formed.

6. The valve as claimed in claim 1, wherein the first poppet is integrally formed and the second poppet is integrally formed.

7. The valve as claimed in claim 1, wherein the first protrusion and the second protrusions within each of the poppets abut against the portion of the levers inside of the poppets.

8. The valve as claimed in claim 1, wherein the pivot points of the levers are located above the diaphragm of the valve body.

* * * * *